(12) United States Patent
Su et al.

(10) Patent No.: US 12,266,757 B2
(45) Date of Patent: Apr. 1, 2025

(54) SECONDARY BATTERY, BATTERY MODULE AND DEVICE

(71) Applicant: CONTEMPORARY AMPEREX TECHNOLOGY (HONG KONG) LIMITED, Hong Kong (CN)

(72) Inventors: Huasheng Su, Ningde (CN); Lei Chen, Ningde (CN); Yulian Zheng, Ningde (CN); Xinxiang Chen, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 768 days.

(21) Appl. No.: 17/547,312

(22) Filed: Dec. 10, 2021

(65) Prior Publication Data

US 2022/0102749 A1 Mar. 31, 2022

Related U.S. Application Data

(63) Continuation of application No. PCT/CN2020/124502, filed on Oct. 28, 2020.

(30) Foreign Application Priority Data

Apr. 26, 2020 (CN) .......................... 202020654976.1

(51) Int. Cl.
*H01M 10/04* (2006.01)
*H01M 50/176* (2021.01)
(Continued)

(52) U.S. Cl.
CPC ..... *H01M 10/0481* (2013.01); *H01M 50/176* (2021.01); *H01M 50/531* (2021.01); *H01M 50/591* (2021.01)

(58) Field of Classification Search
CPC ........... H01M 10/0481; H01M 50/176; H01M 50/531; H01M 50/691; H01M 50/209;
(Continued)

(56) References Cited

U.S. PATENT DOCUMENTS

2016/0099444 A1 4/2016 Park et al.
2021/0074963 A1* 3/2021 Zhang ................. H01M 50/533

FOREIGN PATENT DOCUMENTS

CN 205488291 U 8/2016
CN 206379415 U 8/2017
(Continued)

OTHER PUBLICATIONS

The International search report for PCT Application No. PCT/CN2020/124502, dated Feb. 3, 2021, 12 pages.
(Continued)

*Primary Examiner* — Adam A Arciero
(74) *Attorney, Agent, or Firm* — East IP P.C.

(57) ABSTRACT

The present application relates to a secondary battery, a battery module and a device. The secondary battery includes a cap plate assembly; an electrode assembly, including a main body and a tab extending from the main body; an electrode terminal, arranged at the cap plate assembly to electrically connect with the tab; a first pressing-against member, arranged between the cap plate assembly and the main body, herein an accommodating space is formed between the first pressing-against member and the electrode terminal; a second pressing-against member, arranged between the cap plate assembly and the main body; herein a part of the tab, that passes between the first pressing-against member and the second pressing-against member and extends into the accommodating space, is connected to the electrode terminal, and the first pressing-against member (Continued)

and the second pressing-against member press against two opposite surfaces of the tab respectively.

18 Claims, 6 Drawing Sheets

(51) Int. Cl.
    *H01M 50/531*     (2021.01)
    *H01M 50/591*     (2021.01)

(58) Field of Classification Search
    CPC ............. H01M 50/271; H01M 50/296; H01M 50/298; H01M 50/503; H01M 50/517; H01M 50/55; H01M 2220/20; H01M 50/249
    See application file for complete search history.

(56) References Cited

FOREIGN PATENT DOCUMENTS

| | | | |
|---|---|---|---|
| CN | 107968182 | A | 4/2018 |
| CN | 108428921 | A | 8/2018 |
| CN | 207690902 | U | 8/2018 |
| CN | 109698385 | A | 4/2019 |
| CN | 208955087 | U | 6/2019 |
| CN | 209344216 | U | 9/2019 |
| CN | 111048728 | A | 4/2020 |
| EP | 3512001 | A1 | 7/2019 |
| EP | 3748732 | A1 | 12/2020 |
| JP | 2018206758 | A | 12/2018 |
| KR | 20180107900 | A | 10/2018 |
| WO | 2012029948 | A1 | 3/2012 |
| WO | 2014166142 | A1 | 10/2014 |
| WO | 2018155522 | A1 | 8/2018 |
| WO | 2019148663 | A1 | 8/2019 |

OTHER PUBLICATIONS

The First Office Action for European Application No. 20926372.2, dated Nov. 15, 2022, 9 pages.
The extended European search report for EP Application No. 20926372.2, dated Jun. 27, 2022, 9 pages.
The First Office Action for Chinese Application No. 202080070281.1, dated Jul. 17, 2023, 9 pages.

* cited by examiner

SECONDARY BATTERY, BATTERY MODULE AND DEVICE

CROSS REFERENCE TO RELATED APPLICATION

The present application is a continuation of International Application No. PCT/CN2020/124502, filed on Oct. 28, 2020, which claims priority to Chinese Patent Application No. 202020654976.1, filed on Apr. 26, 2020, titled "SECONDARY BATTERY, BATTERY MODULE AND DEVICE USING SECONDARY BATTERY AS POWER SOURCE", both of which are hereby incorporated by reference in their entireties.

TECHNICAL FIELD

The present application relates to the technical field of battery, and in particular to a secondary battery, a battery module, and a device including the secondary battery used as a power source.

BACKGROUND

With the development of science and technology, secondary batteries are widely used to supply power to high-power devices, such as electric vehicles or the like. The secondary battery forms a battery module by connecting a plurality of battery cells in series or in parallel to achieve a larger capacity or power.

The secondary battery includes a case, an electrode assembly arranged in the case, a cap plate assembly connected with the case, and an electrode terminal arranged on the cap plate assembly. The electrode assembly includes a positive electrode sheet, a separator and a negative electrode sheet. Each of the positive electrode sheet and the negative electrode sheet includes a coated area and an uncoated area. The coated area is wound or stacked to form a main body, and the uncoated area is stacked to form a tab. The tab of the electrode assembly is connected to the electrode terminal. In some cases, there is a short-circuit phenomenon between the positive electrode sheet and the negative electrode sheet of the electrode assembly, affecting the operational safety of the secondary battery.

SUMMARY

The present application provides a secondary battery, a battery module, and a device using the secondary battery as a power source. The secondary battery can reduce the possibility that a tab is inserted into a main body to cause a short circuit between a positive electrode sheet and a negative electrode sheet.

In one aspect, the secondary battery provided by the present application includes:
a cap plate assembly; an electrode assembly, including a main body and a tab extending from the main body; an electrode terminal, arranged at the cap plate assembly to electrically connect with the tab; a first pressing-against member, arranged between the cap plate assembly and the main body, herein an accommodating space is formed between the first pressing-against member and the electrode terminal; a second pressing-against member, arranged between the cap plate assembly and the main body; herein a part of the tab, that passes between the first pressing-against member and the second pressing-against member and extends into the accommodating space, is connected to the electrode terminal, and the first pressing-against member and the second pressing-against member press against two opposite surfaces of the tab respectively.

According to the secondary battery provided by the present application, the secondary battery includes the first pressing-against member and the second pressing-against member which are used to restrict a position of the tab. The tab passes between the first pressing-against member and the second pressing-against member. The first pressing-against member and the second pressing-against member can press against two opposite surfaces of the tab respectively, thereby reducing the looseness degree of the tab, so that it is beneficial to reduce the possibility that a tab is inserted into a main body to cause the short circuit between a positive electrode sheet and a negative electrode sheet and can improve an operation safety of the secondary battery.

According to an embodiment of the present application, the first pressing-against member and the second pressing-against member are arranged to be at least partially overlapped with each other in a thickness direction of the cap plate assembly, a gap is formed between overlapping portions of the first pressing-against member and the second pressing-against member, and the tab passes through the gap.

Since the tab need to pass through the gap and then enter the accommodating space, the first pressing-against member and the second pressing-against member can further extend an extension path of the tab, so that it is beneficial to further reduce the possibility of the length redundancy of the tab, thereby reducing the possibility of the tab being inserted into the main body.

According to an embodiment of the present application, the first pressing-against member includes a first supporting portion and a first connecting portion arranged to intersect with each other;
the first supporting portion is located on a side of the electrode terminal close to the main body in the thickness direction, and is arranged to be spaced apart from the electrode terminal; an edge portion of the first supporting portion in a width direction of the cap plate assembly presses against the surface of the tab;
the first connecting portion is arranged on a side of the first supporting portion in a length direction of the cap plate assembly, and is configured to connect with the cap plate assembly.

The first supporting portion is pressed against the surface of the tab through the edge portion, so that it can reduce the possibility that the structural damage occurs because of the stress concentration in the tab.

According to an embodiment of the present application, the second pressing-against member includes a second supporting portion and a second connecting portion arranged to intersect with each other; the second supporting portion is located on a side of the first supporting portion close to the main body in the thickness direction of the cap plate assembly, and is at least partially overlapped with the first supporting portion to form the gap; an edge portion of the second supporting portion in the width direction of the cap plate assembly presses against the surface of the tab; the second connecting portion is arranged on a side of the second supporting portion in the width direction of the cap plate assembly, and is configured to connect with the cap plate assembly.

According to an embodiment of the present application, in the width direction of the cap plate assembly, a part of the tab is located between the second connecting portion and the first supporting portion.

According to an embodiment of the present application, the second connecting portion can be arranged to separate the tab and a case in the width direction, thereby reducing the possibility that the short circuit occurs between the tab and the case because of the contact between the tab and the case.

According to an embodiment of the present application, a cross-section of a combination of the second supporting portion and the second connecting portion is in an L-like shape.

According to an embodiment of the present application, a surface of the edge portion pressing against the tab is a smooth-transition surface.

The second supporting portion presses against the surface of the tab through the edge portion, so that it can reduce the possibility that the structural damage occurs because of the stress concentration in the tab.

According to an embodiment of the present application, the cap plate assembly comprises a cap plate and an insulating member, and the insulating member is connected to a side of the cap plate close to the main body;

the first pressing-against member engages with the insulating member in the way of snap fit; and/or, the second pressing-against member engages with the insulating member in the way of snap fit.

According to an embodiment of the present application, the secondary battery includes two sets of the electrode assemblies and two second pressing-against members; the two sets of the electrode assemblies are arranged side by side in the width direction of the cap plate assembly and the two second pressing-against members are arranged side by side in the width direction of the cap plate assembly; the tab of one of the two sets of electrode assemblies passes between one of the second pressing-against member and the first pressing-against member, and the tab of the other set of electrode assemblies is passes between the other second pressing-against member and the first pressing-against member.

According to an embodiment of the present application, one of the two second pressing-against members has a positioning concave portion, and the other second pressing-against member has a positioning convex portion inserted into the positioning concave portion.

When the two second pressing-against members are spliced in the width direction, the positioning convex portion can enter the positioning concave portion and be guided to restrict a position by the positioning concave portion, thereby improving the accuracy of the installation position and the convenience of installation of the two second pressing-against members.

According to an embodiment of the present application, the tab has an end and a root, the first pressing-against member presses against an area on the tab close to the end, and the second pressing-against member presses against an area on the tab close to the root.

In another aspect, a battery module is provided by the present application, including the secondary battery as described above.

In another aspect, a device using the secondary battery as a power source is provided by the present application, including the secondary battery as described above.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

In the drawings, the drawings may not be drawn to the actual scale.

In the drawings:
1-vehicle; 10-battery pack; 20-battery module set; 30-secondary battery; 31-case; 32-electrode assembly; 321-main body; 322-tab; 40-cap plate assembly; 41-cap plate; 42-insulating member; 50-electrode terminal; 60-first pressing-against member; 61-first supporting portion; 62-first connecting portion; 70-second pressing-against member; 70a-positioning concave portion; 70b-positioning convex portion; 71-second supporting portion; 72-second connecting portion; 80-snap-fit portion; 90-snap-fit slot; 100-accommodating space; 200-gap; X-width direction; Y-thickness direction; Z-length direction.

DETAILED DESCRIPTION

The embodiments of the present application will be described in further detail below conjunction with the drawings and the embodiments. The detailed description and drawings of the following embodiments are used to exemplarily illustrate the principle of the present application, but cannot be used to limit the scope of the present application, in other words, the present application is not limited to the described embodiments.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", "third", etc. are only used for descriptive purposes, and cannot be understood as indicating or implying relative importance. The term "perpendicular" does not mean strictly perpendicular, but within the allowable range of error. The term "parallel" does not mean strictly parallel, but within the allowable range of error.

The orientation words appearing in the following description are all directions shown in the drawings, and do not limit the specific structure of the present application. In the description of the present application, it should also be noted that, unless otherwise clearly specified and limited, the terms "installed", "connecting" and "connected" should be understood in a broad sense, for example, it can be a fixed connection, a detachable connection, or an integral connection, it can be a direct connection, or it can be connected indirectly through an intermediary. For those of ordinary skill in the art, the specific meaning of the above-mentioned terms in the present application can be understood according to specific situations.

After paying attention to the poor safety performance of a secondary battery, the applicant has researched and analyzed on each structure of the secondary battery 30. The applicant found that an electrode assembly had a short-circuit problem between a positive electrode sheet and a negative electrode sheet, which caused a potential risk about the safety of the secondary battery. After further research and analysis, the applicant found that a tab was inserted into a main body in the secondary battery, so that it might result in a short circuit between the positive electrode sheet and the negative electrode sheet.

Based on the above-mentioned problems found by the applicant, the applicant has improved the structure of the secondary battery, and the embodiments of the present application will be further described below.

In order to better understand the present application, the following describes the embodiments of the present application in conjunction with FIG. 1 to FIG. 10.

Figure 1:
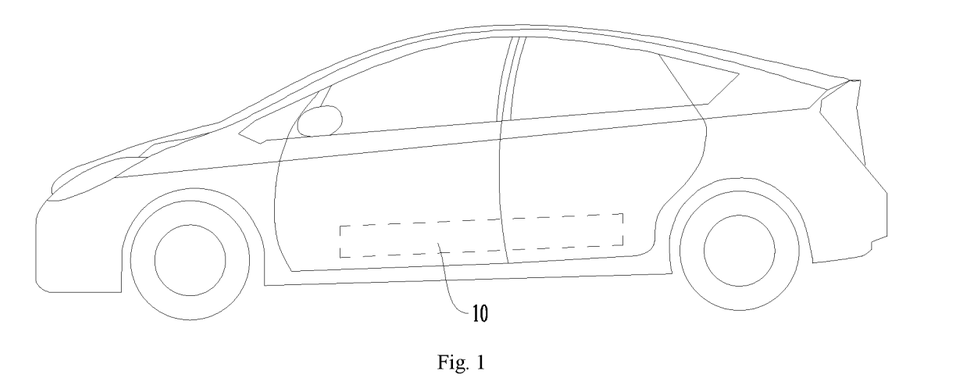
FIG. 1 shows a structural schematic view of a vehicle according to an embodiment of the present application.

A device using a secondary battery 30 as a power source is provided by an embodiment of the present application. The device can be, but is not limited to, a vehicle, a ship, or an aircraft. As shown in FIG. 1, the embodiment of the present application provides the vehicle 1 including a vehicle body and a battery module. The battery module is arranged in the vehicle body. Herein, the vehicle 1 may be a pure electric vehicle, a hybrid electric vehicle or an extended-range vehicle. The vehicle body is provided with a drive motor electrically connected to the battery module. The battery module provides electric power to the drive motor. The drive motor is connected to a wheel on the vehicle body through a transmission mechanism to drive the vehicle to travel. Exemplarily, the battery module may be horizontally arranged at a bottom portion of the vehicle body.

Figure 2:
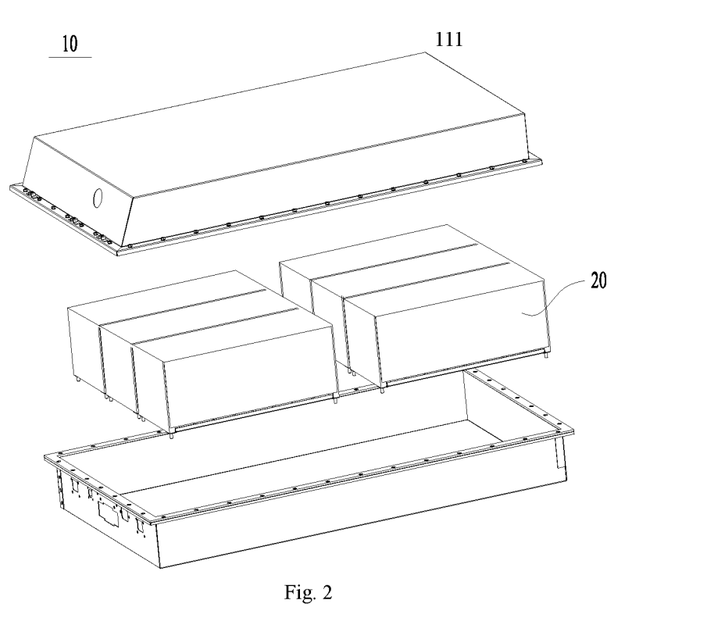
FIG. 2 shows an exploded structural schematic view of a battery pack according to an embodiment of the present application.

As shown in FIG. 2, the battery module may be a battery pack 10. There are many ways to arrange the battery pack 10. In some optional embodiments, the battery pack 10 includes a housing body and the battery module set 20 arranged in the housing body. The number of battery module sets 20 is one or more. The one or more battery module sets 20 are arranged in a row in the housing body. The type of housing body is not limited. The housing body can be a frame-shaped housing body, a disc-shaped housing body, or a box-shaped housing body. Exemplarily, the housing body includes a lower housing body for accommodating the battery module set 20 and an upper housing body covering and closing the lower housing body. The upper housing body covers and closes the lower housing body to form an accommodating portion for accommodating the battery module set 20. It should be understood that the battery module may be the battery module set 20, and the battery module set 20 can be directly arranged on the vehicle body.

Figure 3:
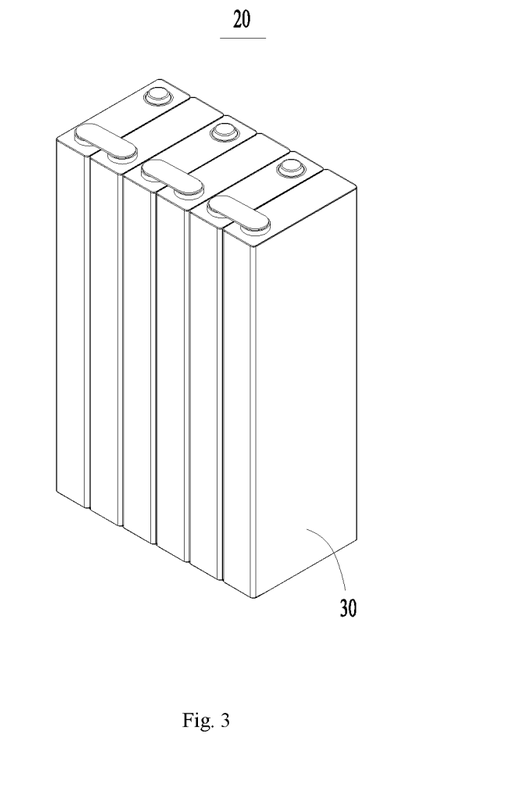
FIG. 3 shows a partial structural schematic view of a battery module set according to an embodiment of the present application.

As shown in FIG. 3, the battery module set 20 includes a plurality of secondary batteries 30. There are many ways to arrange the battery module set 20. In an embodiment, the battery module set 20 includes the accommodating portion and the plurality of secondary batteries 30 located in the accommodating portion. The plurality of secondary batteries 30 are arranged side by side in the accommodating portion. There are many ways to arrange the accommodating portion, for example, the accommodating portion includes a shell and a cap covering the shell; or, the accommodating portion includes side plates that are successively enclosed and connected to one another and an end plate; or, the accommodating portion includes two end plates arranged to opposite to each other and a band surrounding the outside of the end plates and the secondary battery 30.

Figure 4:
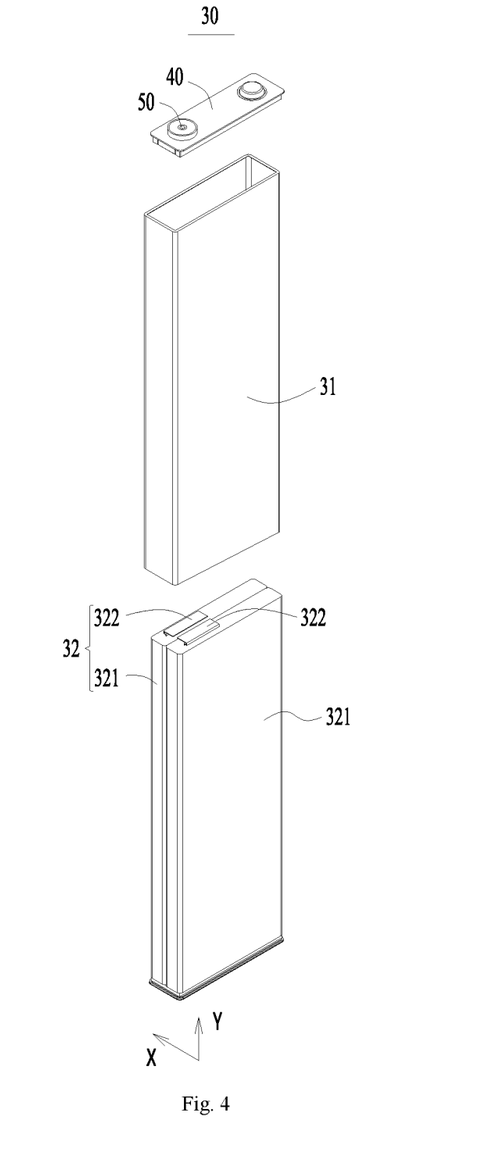
FIG. 4 shows an exploded structural schematic view of a secondary battery according to an embodiment of the present application.

As shown in FIG. 4, the secondary battery 30 in the embodiment of the present application includes a case 31, an electrode assembly 32 arranged in the case 31, and a cap plate assembly 40 sealingly connected to the case 31.

The case 31 in the embodiment of the present application has a square-shaped structure or other shapes. The case 31 has an internal space for accommodating the electrode assembly 32 and electrolyte, and an opening communicating with the internal space. The case 31 may be made of a conductive material such as aluminum or aluminum alloy.

The electrode assembly 32 in the embodiment of the present application may form the main body 321 by stacking or winding a first electrode sheet, a second electrode sheet and a separator located between the first electrode sheet and second electrode sheet together; herein, the separator is an insulator between the first electrode sheet and the second electrode sheet. The main body 321 of this embodiment has a flat-sheet-shaped structure as a whole. The main body 321 has a wide surface and a narrow surface alternately arranged in a circumference direction of itself. The main body 321 has two end surfaces opposite to each other in an axial direction of itself. In this embodiment, the first electrode sheet is exemplarily described as a positive electrode sheet and the second electrode sheet is exemplarily described as a negative electrode sheet. A positive-electrode-sheet active material is coated on a coated area of the positive electrode sheet, and a negative-electrode-sheet active material is coated on a coated area of the negative electrode sheet. A plurality of uncoated areas extending from the coated area of the main body 321 are stacked as a tab 322. The electrode assembly 32 includes two tabs 322, namely, a positive tab and a negative tab. The positive tab extends from the coated area of the positive electrode sheet, and the negative tab extends from the coated area of the negative electrode sheet. The tab 322 includes a plurality of layer structures. In the embodiment of the present application, the tab 322 extends from each of the two end surfaces opposite to each other of the main body 321. In the embodiment in which the main body 321 is a winding structure, a width direction X of the cap plate assembly 40 refers to a direction perpendicular to the wide surface, and a thickness direction Y refers to a direction parallel to a winding axis of the main body 321. In the embodiment in which the main body 321 is a stacked-sheet structure, the width direction X of the cap plate assembly 40 refers to a stacking direction of the first electrode sheet, the separator and the electrode sheet, and the thickness direction Y refers to a direction in which the tab 322 extends from the main body 321.

Figure 5:
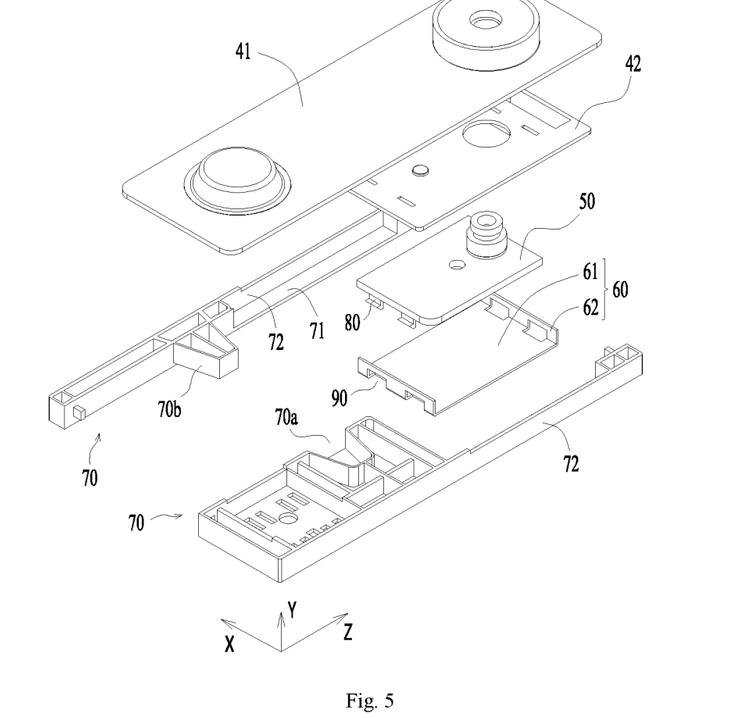
FIG. 5 shows an exploded structural schematic view of a cap plate assembly according to an embodiment of the present application.

As shown in FIG. 4 and FIG. 5, the cap plate assembly 40 in the embodiment of the present application includes a cap plate 41 and an electrode terminal 50. The cap plate 41 in the embodiment of the present application has an outer surface and an inner surface opposite to each other in the thickness direction Y, and an electrode lead-out hole (not shown in the drawings) extending in the thickness direction Y. The cap plate 41 can cover and close the opening of the case 31 and is sealingly connected to the case 31. The electrode terminal 50 is arranged on the cap plate 41 and arranged corresponding to the electrode lead-out hole. The electrode terminal 50 is used to electrically connect to a bus bar. The tab 322 of the electrode assembly 32 is used to connect to the electrode terminal 50.

Based on the above-mentioned problems found by the applicant, the applicant has improved the structure of the secondary battery 30, and the embodiments of the present application will be further described below.

In an embodiment, as shown in FIG. 5, the secondary battery 30 in the embodiment of the present application further includes a first pressing-against member 60 and a second pressing-against member 70. Each of the first pressing-against member 60 and the second pressing-against member 70 is connected to the cap plate assembly 40. The cap plate assembly 40 includes the cap plate 41 and an insulating member 42. The insulating member 42 is connected to the cap plate 41 and is located at a side of the cap plate 41 close to the main body 321 in the thickness direction Y. The insulating member 42 is used to insulate and isolate the electrode terminal 50 and the cap plate 41. In an example, the first pressing-against member 60 engages with the insulating member 42 in the way of snap fit. Exemplarily, the first pressing-against member 60 has a snap-fit slot 90, and the insulating member 42 has a snap-fit portion 80 for engaging with the snap-fit slot 90 in the way of snap fit. Further exemplarily, the first pressing-against member 60 has the snap-fit portion 80, and the insulating member 42 has the snap-fit slot 90 for engaging with the snap-fit portion 80 in the way of snap fit. In an example, the second pressing-against member 70 engages with the insulating member 42 in the way of snap fit. Exemplarily, the second pressing-against member 70 has the snap-fit slot 90, and the insulating member 42 has the snap-fit portion 80 for engaging with the snap-fit slot 90 in the way of snap fit. Further exemplarily, the second pressing-against member 70 has the snap-fit slot 90, and the insulating member 42 has the snap-fit slot 90 for engaging with the snap-fit portion 80 in the way of snap fit.

Figure 6:
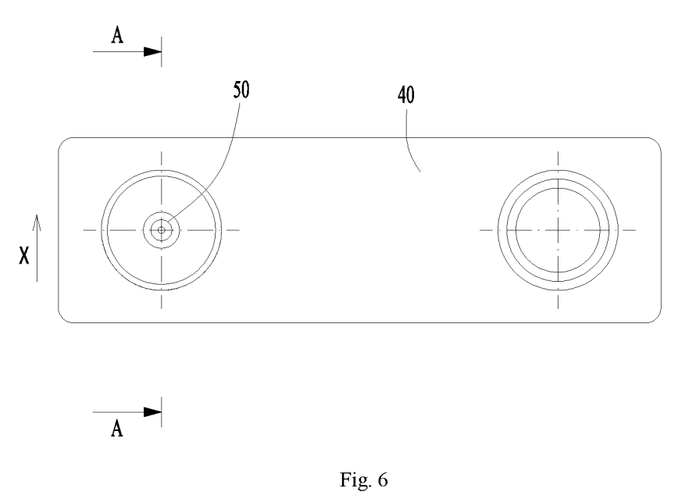
FIG. 6 shows a structural schematic top view of a cap plate assembly according to an embodiment of the present application.
Figure 7:
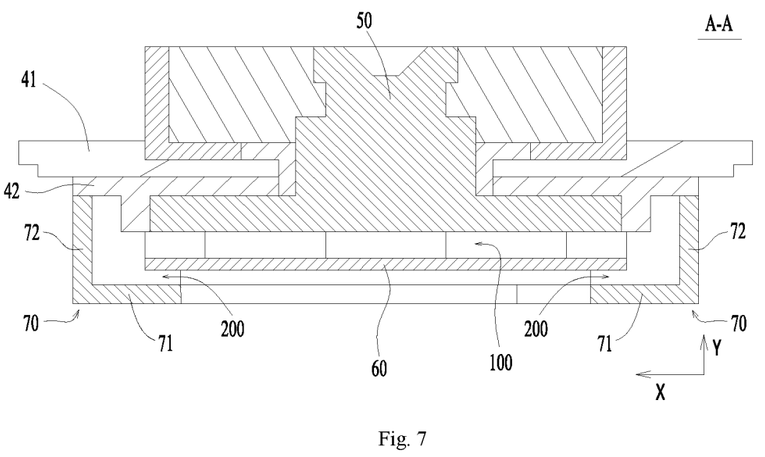
FIG. 7 shows a schematic cross-sectional view taken along line A-A in FIG. 6.
Figure 8:
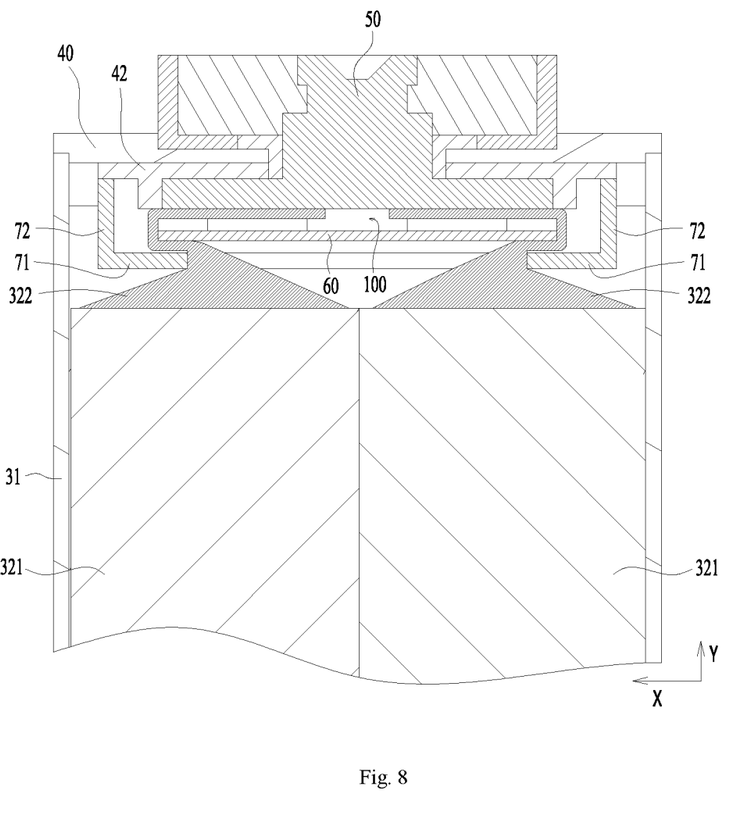
FIG. 8 shows a partial structural schematic cross-sectional view of a secondary battery according to an embodiment of the present application.

As shown in FIG. 6 and FIG. 7, the first pressing-against member 60 is arranged between the cap plate assembly 40 and the main body 321. An accommodating space 100 is formed between the first pressing-against member 60 and the electrode terminal 50. The accommodating space 100 may be penetrated in the width direction X. The second pressing-against member 70 is arranged between the cap plate assembly 40 and the main body 321. As shown in FIG. 8, a part of the tab 322 that passes between the first pressing-against member 60 and the second pressing-against member 70 and extends into the accommodating space 100 is connected to the electrode terminal 50. The first pressing-against member 60 and the second pressing-against member 70 press against two opposite surfaces of the tab 322, respectively. The first pressing-against member 60 and the second pressing-against member 70 together apply a compressive stress to the tab 322. Thus, on the one hand, the first pressing-against member 60 and the second pressing-against member 70 form a position restricting to the tab 322 by pressing against the two opposite surfaces of the tab 322, thereby reducing the looseness and deformation degrees of the tab 322, and reducing the possibility that the tab 322 is inserted into the main body 321 because of the deformation of the tab 322; on the other hand, the first pressing-against member 60 can isolate an unwelded portion of the tab 322 and the electrode terminal 50 from the main body 321, thereby reducing the possibility that the unwelded portion of the tab 322 is inserted into the main body 321. In an example, the tab 322 has an end and a root. The first pressing-against member 60 presses against the area close to the end of the tab 322, and the second pressing-against member 70 presses against the area close to the root of the tab 322, therefore, compared with an area where the first pressing-against member 60 presses against the tab 322, an area where the second pressing-against member 70 presses against the tab 322 is closer to the main body 321.

As shown in FIG. 7 and FIG. 8, the first pressing-against member 60 and the second pressing-against member 70 are arranged to be at least partially overlapped with each other in the thickness direction Y, and a gap 200 is formed in an overlapping area between the first pressing-against member 60 and the second pressing-against member 70. The gap 200 has a predetermined size in the width direction X. Since the tab 322 needs to pass through the gap 200 and then enter the accommodating space 100, the first pressing-against member 60 and the second pressing-against member 70 can further extend an extension path of the tab 322, so that it is beneficial to further reduce the possibility of the length redundancy of the tab 322, thereby reducing the possibility of the tab 322 being inserted into the main body 321.

In an embodiment, the first pressing-against member 60 includes a first supporting portion 61 and a first connecting portion 62 arranged to intersect with each other. The first supporting portion 61 is located on a side of the electrode terminal 50 close to the main body 321 in the thickness direction Y, and is arranged to be spaced apart from the electrode terminal 50 to form the accommodating space 100. An edge portion of the first supporting portion 61 in the width direction X is used to press against the surface of the tab 322. Exemplarily, a surface of the edge portion pressing against the tab 322 can be a smooth-transition surface, such as an arc surface, so as to reduce the possibility that the structural damage occurs because of the stress concentration in the tab 322. The first connecting portion 62 is arranged on a side of the first supporting portion 61 in a length direction Z of the cap plate assembly 40 and is used to connect to the cap plate assembly 40. The length direction Z of the cap plate assembly 40 is perpendicular to the width direction X and the thickness direction Y. The second pressing-against member 70 includes a second supporting portion 71 and a second connecting portion 72 arranged to intersect with each other. The second supporting portion 71 is located on a side of the first supporting portion 61 close to the main body 321 in the thickness direction Y of the cap plate assembly 40, and is at least partially overlapped with the first supporting portion 61 to form the gap 200; an edge portion of the second supporting portion 71 in the width direction X presses against the surface of the tab 322. Exemplarily, a surface of the edge portion pressing against the tab 322 is the smooth-transition surface, such as the arc surface, so as to reduce the possibility that the structural damage occurs because of the stress concentration in the tab 322. The second connecting portion 72 is arranged on a side of the second supporting portion 71 in the width direction X of the cap plate assembly 40, and is used to connect to the cap plate assembly 40. Exemplarily, a cross-section of a combination of the second supporting portion 71 and the second connecting portion 72 is in an L-like shape, so that a concave portion is formed by the second supporting portion 71 and the second connecting portion 72. The concave portion communicates with the accommodation space 100.

As shown in FIG. 8, in the width direction X of the cap plate assembly 40, a part of the tab 322 is located between the second connecting portion 72 and the first supporting portion 61. Since the tab 322 has a multi-layer structure, after the tab 322 passes between the second supporting portion 71 and the first supporting portion 61, the part of the tab 322 corresponding to the second connecting portion 72 may be fluffy in the width direction X. The second connecting portion 72 can be arranged to separate the tab 322 and the case 31 in the width direction X, thereby reducing the possibility that the short circuit occurs between the tab 322 and the case 31 because of the contact between the tab 322 and the case 31.

As shown in FIG. 5, the secondary battery 30 includes two second pressing-against members 70. The two second pressing-against members 70 are arranged side by side in the width direction X of the cap plate assembly 40. A relief hole is formed between the two second supporting portions 71. The tab 322 can pass through the relief hole. In an example, one of the two second pressing-against members 70 has a positioning concave portion 70a, and the other second pressing-against member 70 has a positioning convex portion 70b inserted into the positioning concave portion 70a. When the two second pressing-against members 70 are spliced in the width direction X, the positioning convex portion 70b can enter the positioning concave portion 70a and be guided to restrict the position by the positioning concave portion 70a, thereby improving the accuracy of the installation position and the convenience of installation of the two second pressing-against members 70. As shown in FIG. 8, the secondary battery 30 includes two sets of electrode assemblies 32. The two sets of electrode assemblies 32 are arranged side by side in the width direction X of the cap plate assembly 40. The tab 322 of one of the two electrode assemblies 32 passes between the second pressing-against member 70 and the first pressing-against member 60, and the tab 322 of the other electrode assembly 32 passes between the other second pressing-against member 70 and the first pressing-against member 60.

Figure 9:
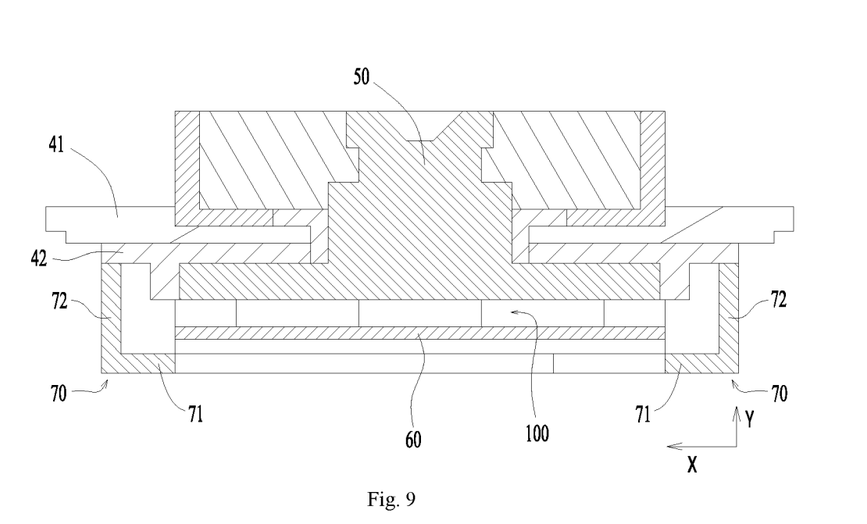
FIG. 9 shows a partial structural schematic cross-sectional view of a cap plate assembly according to an embodiment of the present application.
Figure 10:
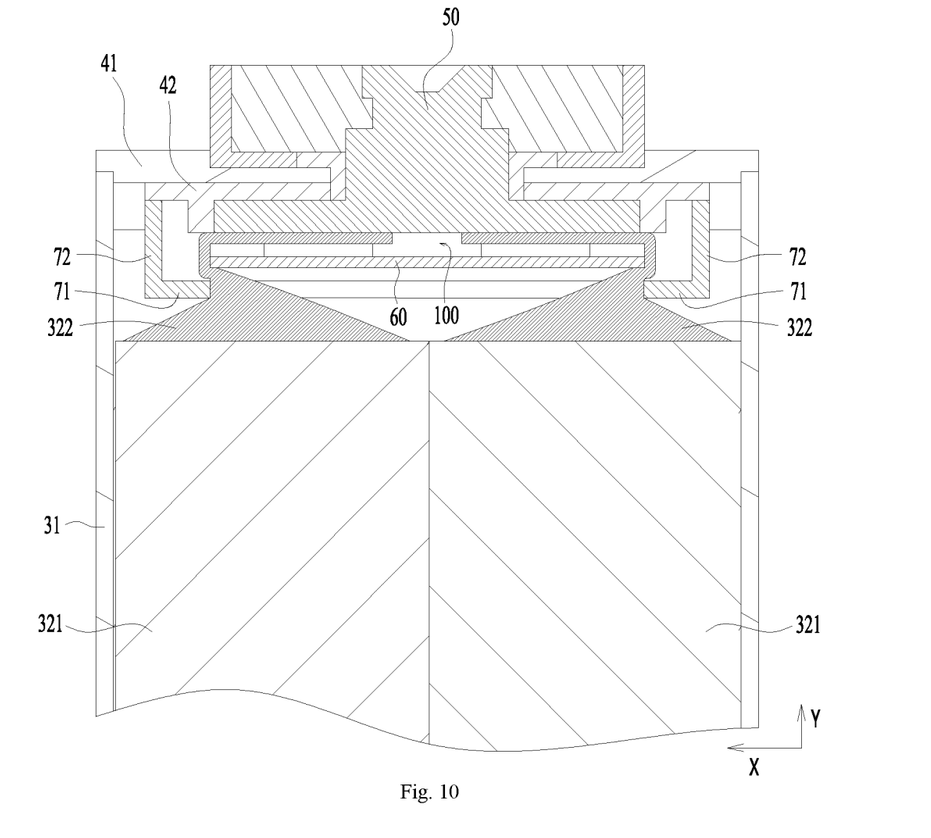
FIG. 10 shows a partial structural schematic cross-sectional view of a secondary battery according to another embodiment of the present application.

In another embodiment, as shown in FIG. 9, the present embodiment mainly describes the differences from the embodiment shown in FIG. 7, and the similarities are not repeated here. In the present embodiment, the first supporting portion 61 of the first pressing-against member 60 has two opposite edge portions in the width direction X. The edge portions are used to press against the surface of the tab 322. The second supporting portion 71 of the second pressing-against member 70 has the edge portion for pressing against the surface of the tab 322. In the thickness direction Y, the surface of the edge portion of the first supporting portion 61 and the surface of the edge portion of the second supporting portion 71 are arranged to be aligned with each other; in other words, in the thickness direction Y, an orthographic projection of the first supporting portion 61 and an orthographic projection of the second supporting portion 71 are aligned and connected with each other. As shown in FIG. 10, the tab 322 passes between the first supporting portion 61 and the second supporting portion 71. The first supporting portion 61 and the second supporting portion 71 press against two opposite surfaces of the tab 322 respectively, thereby restricting a position of the tab 322.

The secondary battery 30 in the embodiment of the present application includes the first pressing-against member 60 and the second pressing-against member 70 that are used to restrict the position of the tab 322. The tab 322 passes between the first pressing-against member 60 and the second pressing-against member 70. The first pressing-against member 60 and the second pressing-against member 70 can press against two opposite surfaces of the tab 322 respectively, thereby reducing the looseness degree of the tab 322, so that it is beneficial to reduce the possibility that the tab 322 is inserted into the main body 321 to cause the short circuit between the positive electrode sheet and the negative electrode sheet and can improve an operation safety of the secondary battery 30.

Although the present application has been described with reference to the preferred embodiments, various modifications can be made to the present application and the components in the present application can be replaced with equivalents without departing from the scope of the present application. In particular, as long as there is no structural conflict, various technical features mentioned in the various embodiments can be combined in any way. The present application is not limited to the specific embodiments disclosed in the text, but includes all technical solutions falling within the scope of claims.

What is claimed is:

1. A secondary battery, comprising
a cap plate assembly;
an electrode assembly, comprising a main body and a tab extending from the main body;
an electrode terminal, arranged at the cap plate assembly to electrically connect with the tab;
a first pressing-against member, arranged between the cap plate assembly and the main body, wherein an accommodating space is formed between the first pressing-against member and the electrode terminal;
a second pressing-against member, arranged between the cap plate assembly and the main body;
wherein a part of the tab, that passes between the first pressing-against member and the second pressing-against member and extends into the accommodating space, is connected to the electrode terminal, and the first pressing-against member and the second pressing-against member press against two opposite surfaces of the tab respectively;
the cap plate assembly comprises a cap plate and an insulating member, and the insulating member is connected to a side of the cap plate closet to the main body; and
the first pressing-against member engages with the insulating member in the way of snap fit; and/or, the second pressing-against member engages with the insulating member in the way of snap fit.

2. The secondary battery according to claim 1, wherein the first pressing-against member and the second pressing-against member are arranged to be at least partially overlapped with each other in a thickness direction of the cap plate assembly, a gap is formed between overlapping portions of the first pressing-against member and the second pressing-against member, and the tab passes through the gap.

3. The secondary battery according to claim 2, wherein the first pressing-against member comprises a first supporting portion and a first connecting portion arranged to intersect with each other;

the first supporting portion is located on a side of the electrode terminal close to the main body in the thickness direction, and is arranged to be spaced apart from the electrode terminal; an edge portion of the first supporting portion in a width direction of the cap plate assembly presses against the surface of the tab; and the first connecting portion is arranged on a side of the first supporting portion in a length direction of the cap plate assembly, and is configured to connect with the cap plate assembly.

4. The secondary battery according to claim 3, wherein the second pressing-against member comprises a second supporting portion and a second connecting portion arranged to intersect with each other;

the second supporting portion is located on a side of the first supporting portion close to the main body in the thickness direction of the cap plate assembly, and is at least partially overlapped with the first supporting portion to form the gap; an edge portion of the second supporting portion in the width direction of the cap plate assembly presses against the surface of the tab; and the second connecting portion is arranged on a side of the second supporting portion in the width direction of the cap plate assembly, and is configured to connect with the cap plate assembly.

5. The secondary battery according to claim 4, wherein in the width direction of the cap plate assembly, a part of the tab is located between the second connecting portion and the first supporting portion.

6. The secondary battery according to claim 4, wherein an end of the second supporting portion in the width direction of the cap plate assembly is arranged at an end of the second connecting portion in the thickness direction of the cap plate assembly.

7. The secondary battery according to claim 3, wherein a surface of the edge portion pressing against the tab is a smooth-transition surface.

8. The secondary battery according to claim 1, wherein the secondary battery comprises two sets of the electrode assemblies and two second pressing-against members; the two sets of the electrode assemblies are arranged side by side in the width direction of the cap plate assembly and the two second pressing-against members are arranged side by side in the width direction of the cap plate assembly; the tab of one of the two sets of electrode assemblies passes between one of the second pressing-against member and the first pressing-against member, and the tab of the other set of electrode assemblies is passes between the other second pressing-against member and the first pressing-against member.

9. The secondary battery according to claim 8, wherein one of the two second pressing-against members has a positioning concave portion, and the other second pressing-against member has a positioning convex portion inserted into the positioning concave portion.

10. The secondary battery according to claim 1, wherein the tab has an end and a root, the first pressing-against member presses against an area on the tab close to the end, and the second pressing-against member presses against an area on the tab close to the root.

11. A battery module, comprising a secondary battery, wherein the secondary battery comprises a cap plate assembly;
an electrode assembly, comprising a main body and a tab extending from the main body;

an electrode terminal, arranged at the cap plate assembly to electrically connect with the tab;

a first pressing-against member, arranged between the cap plate assembly and the main body, wherein an accommodating space is formed between the first pressing-against member and the electrode terminal;

a second pressing-against member, arranged between the cap plate assembly and the main body;

wherein a part of the tab, that passes between the first pressing-against member and the second pressing-against member and extends into the accommodating space, is connected to the electrode terminal, and the first pressing-against member and the second pressing-against member press against two opposite surfaces of the tab respectively;

the cap plate assembly comprises a cap plate and an insulating member, and the insulating member is connected to a side of the cap plate closet to the main body; and the first pressing-against member engages with the insulating member in the way of snap fit; and/or, the second pressing-against member engages with the insulating member in the way of snap fit.

12. The battery module according to claim 11, wherein the first pressing-against member and the second pressing-against member are arranged to be at least partially overlapped with each other in a thickness direction of the cap plate assembly, a gap is formed between overlapping portions of the first pressing-against member and the second pressing-against member, and the tab passes through the gap.

13. The battery module according to claim 12, wherein the first pressing-against member comprises a first supporting portion and a first connecting portion arranged to intersect with each other;

the first supporting portion is located on a side of the electrode terminal close to the main body in the thickness direction, and is arranged to be spaced apart from the electrode terminal; an edge portion of the first supporting portion in a width direction of the cap plate assembly presses against the surface of the tab; and the first connecting portion is arranged on a side of the first supporting portion in a length direction of the cap plate assembly, and is configured to connect with the cap plate assembly.

14. The battery module according to claim 13, wherein the second pressing-against member comprises a second supporting portion and a second connecting portion arranged to intersect with each other;

the second supporting portion is located on a side of the first supporting portion close to the main body in the thickness direction of the cap plate assembly, and is at least partially overlapped with the first supporting portion to form the gap; an edge portion of the second supporting portion in the width direction of the cap plate assembly presses against the surface of the tab; and the second connecting portion is arranged on a side of the second supporting portion in the width direction of the cap plate assembly, and is configured to connect with the cap plate assembly.

15. The battery module according to claim 14, wherein in the width direction of the cap plate assembly, a part of the tab is located between the second connecting portion and the first supporting portion.

16. The battery module according to claim 14, wherein an end of the second supporting portion in the width direction of the cap plate assembly is arranged at an end of the second connecting portion in the thickness direction of the cap plate assembly.

17. The battery module according to claim 13, wherein a surface of the edge portion pressing against the tab is a smooth-transition surface.

18. A device comprising a secondary battery used as a power source, wherein the secondary battery comprises
- a cap plate assembly;
- an electrode assembly, comprising a main body and a tab extending from the main body;
- an electrode terminal, arranged at the cap plate assembly to electrically connect with the tab;
- a first pressing-against member, arranged between the cap plate assembly and the main body, wherein an accommodating space is formed between the first pressing-against member and the electrode terminal;
- a second pressing-against member, arranged between the cap plate assembly and the main body;
- wherein a part of the tab, that passes between the first pressing-against member and the second pressing-against member and extends into the accommodating space, is connected to the electrode terminal, and the first pressing-against member and the second pressing-against member press against two opposite surfaces of the tab respectively;
- the cap plate assembly comprises a cap plate and an insulating member, and the insulating member is connected to a side of the cap plate closet to the main body; and
- the first pressing-against member engages with the insulating member in the way of snap fit; and/or, the second pressing-against member engages with the insulating member in the way of snap fit.

* * * * *